United States Patent
Fujino et al.

[11] Patent Number: 6,085,222
[45] Date of Patent: Jul. 4, 2000

[54] DISTRIBUTED COMMUNICATION SYSTEM WITH ADAPTIVE DATA SENDING CONTROL IN A COMPUTER NETWORK

[75] Inventors: Nobutsugu Fujino; Masanaga Tokuyo; Ichiro Iida, all of Kawasaki, Japan

[73] Assignee: Fujitsu Limited, Kawasaki, Japan

[21] Appl. No.: 09/037,018

[22] Filed: Mar. 9, 1998

[30] Foreign Application Priority Data

Jul. 31, 1997 [JP] Japan .................................. 9-206742

[51] Int. Cl.[7] .................................................. G06F 15/16
[52] U.S. Cl. ............................................................ 709/202
[58] Field of Search ................................... 709/202, 223, 709/224, 225, 229, 239

[56] References Cited

U.S. PATENT DOCUMENTS

| | | | |
|---|---|---|---|
| 5,499,364 | 3/1996 | Klein et al. | 709/202 |
| 5,561,769 | 10/1996 | Kumar et al. | 709/202 |
| 5,655,081 | 8/1997 | Bonnell et al. | 709/202 |
| 5,721,908 | 2/1998 | Lagarde et al. | 707/10 |
| 5,740,368 | 4/1998 | Villalpando | 709/202 |
| 5,768,506 | 6/1998 | Randell | 709/202 |
| 5,774,656 | 6/1998 | Hattori et al. | 709/230 |
| 5,790,789 | 8/1998 | Suarez | 709/202 |
| 5,850,517 | 12/1998 | Verkler et al. | 709/202 |
| 6,503,054 | 2/1997 | Theimer et al. | 709/202 |

*Primary Examiner*—Zarni Maung
*Attorney, Agent, or Firm*—Staas & Halsey, LLP

[57] ABSTRACT

Agents for performing data communication controls are installed in the respective terminals of a server which offers information such as image data, and of a client who wishes to acquire the information. Agents for controlling data communications are also installed in gateways inserted in networks to which the server and the client are connected. The agents acquire information items on the transmission bands of the networks, the structures of the other networks, etc. and information items on the processing capability of the terminal of the client, etc. by such a method of exchanging dummy packets with one another. The data to be transmitted from the terminal of the server to the terminal of the client are converted on the basis of the acquired information items by the agents.

28 Claims, 13 Drawing Sheets

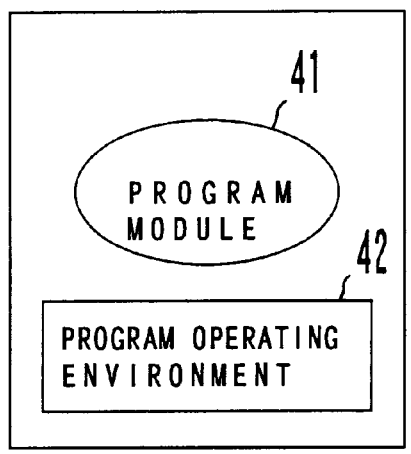
F I G. 4 A
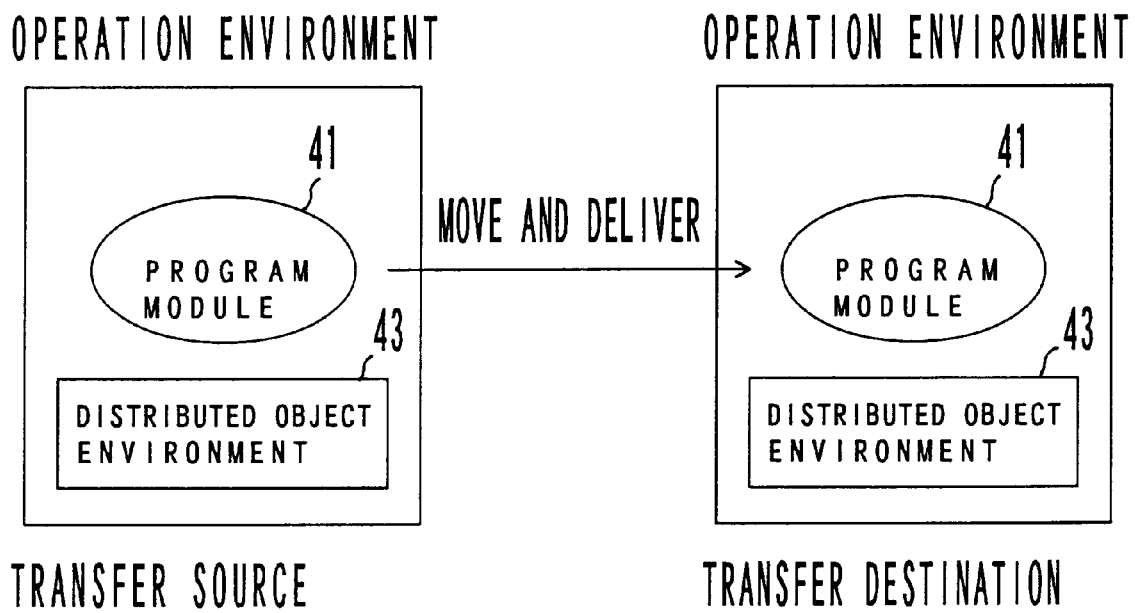
F I G. 4 B

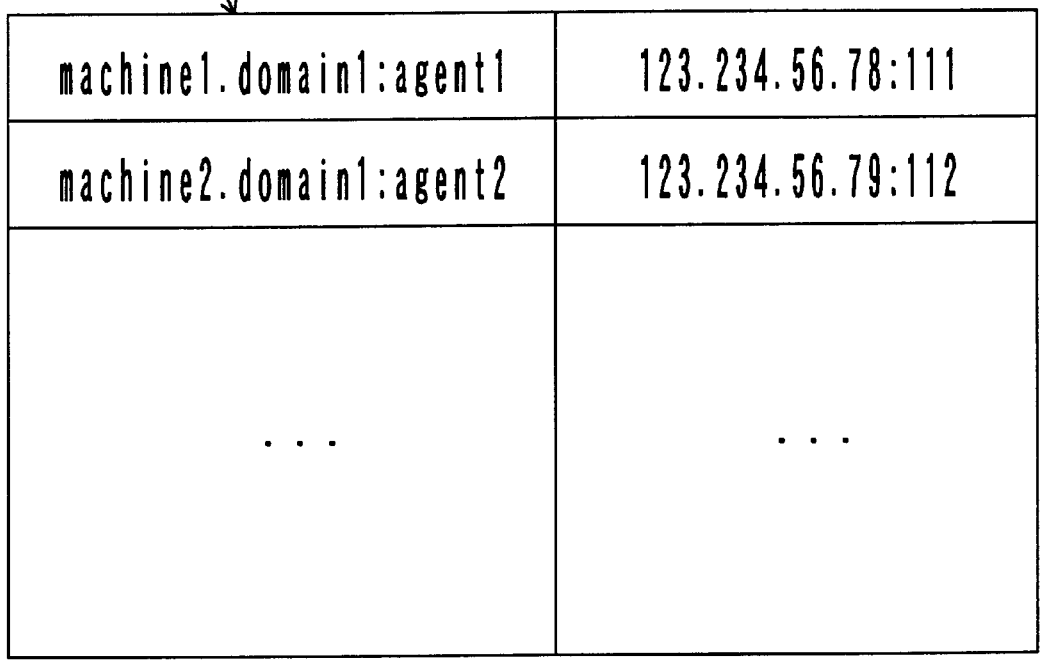
F I G. 6

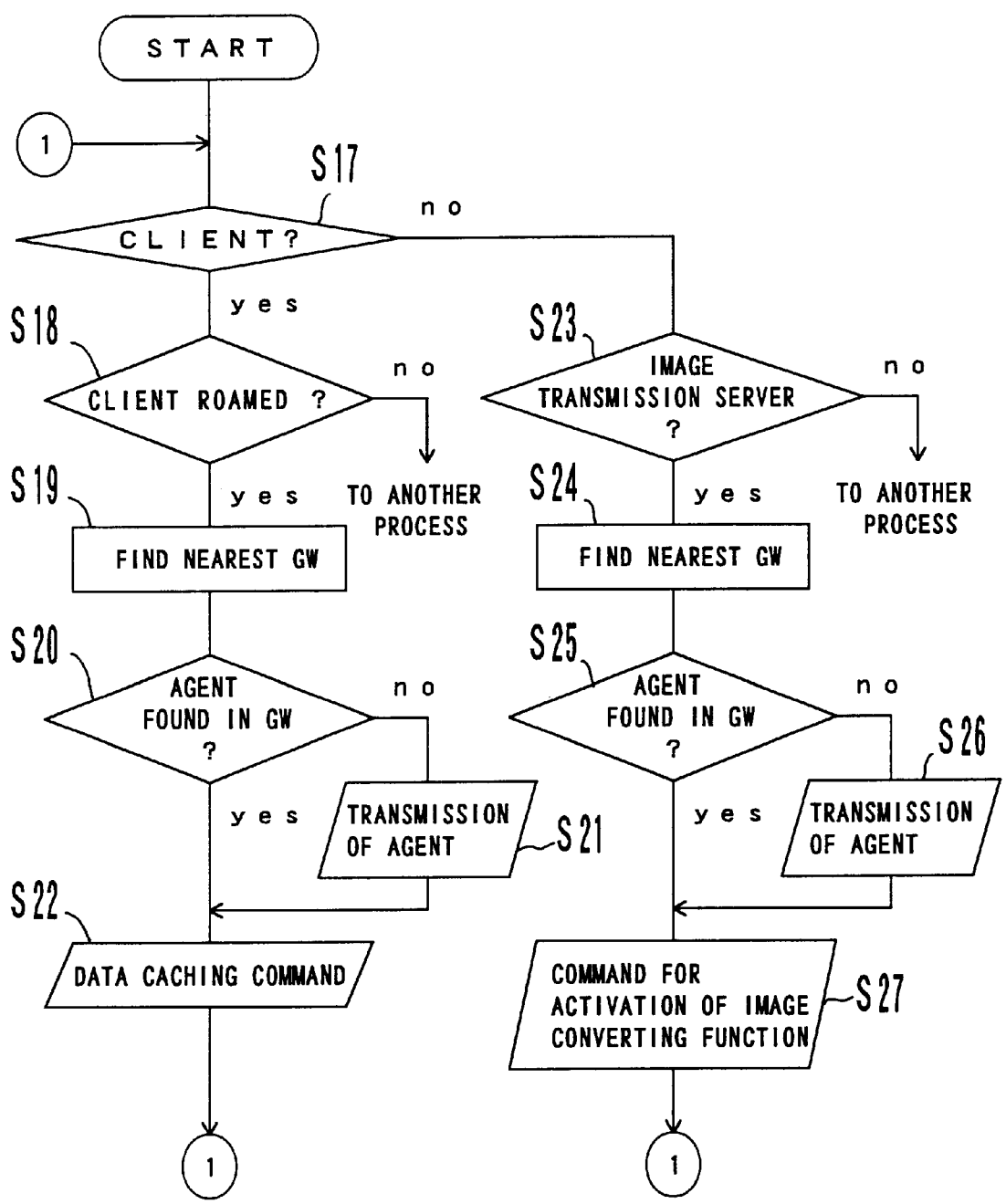
F I G. 8

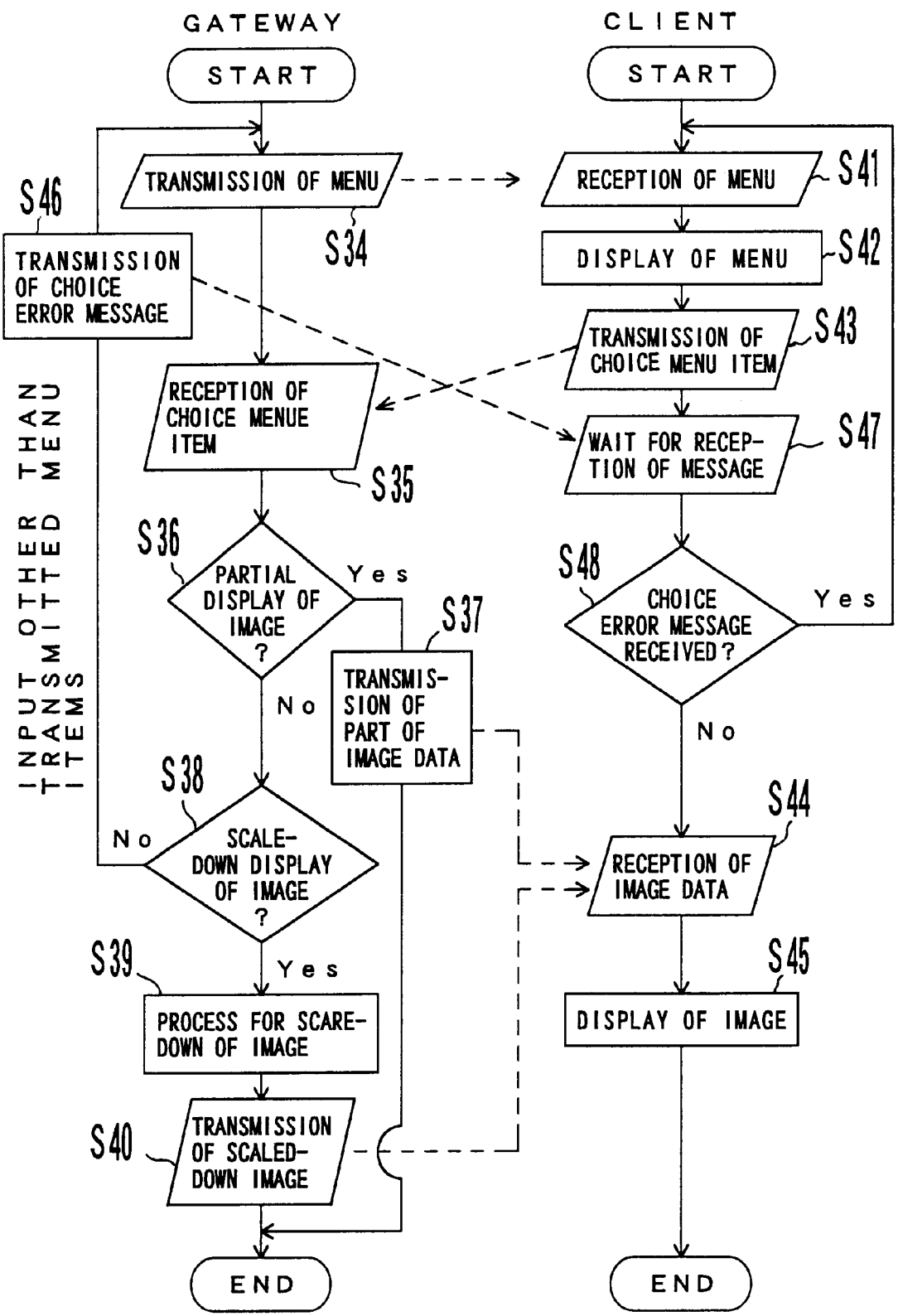
F I G. 10

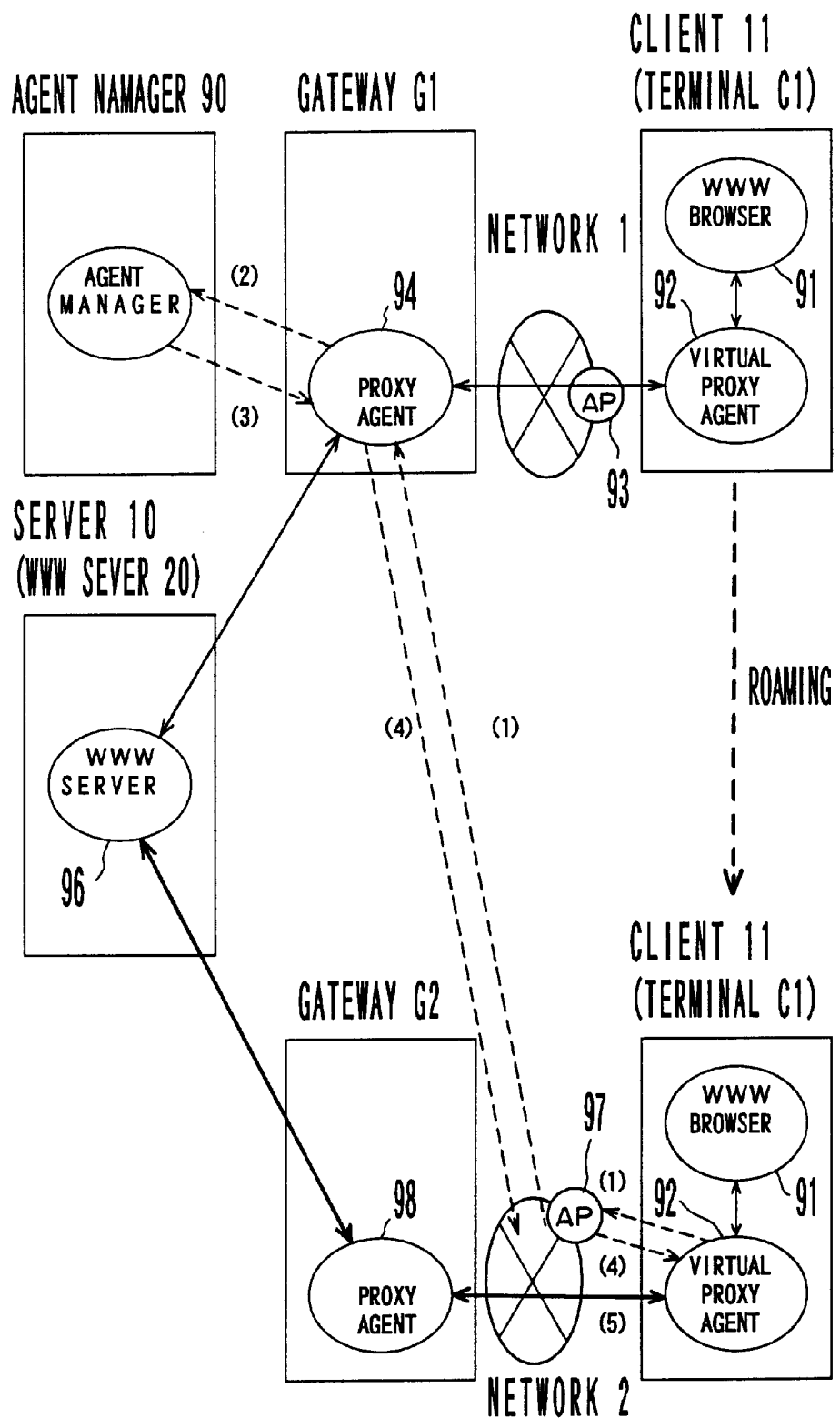
F I G. 1 2

DISTRIBUTED COMMUNICATION SYSTEM WITH ADAPTIVE DATA SENDING CONTROL IN A COMPUTER NETWORK

BACKGROUND OF THE INVENTION

1. Field of the Invention

The present invention relates to the control of data communication based on a distributed control system in a computer network wherein various sorts of networks and terminals are connected.

2. Description of the Related Art

Heretofore, the Internet has been chiefly made up of comparatively uniform networks (in other words, networks whose properties such as transmission rates are substantially the same). By way of example, a private LAN in an enterprise or a university has employed Ethernet cable of 10 MHz, and individual organizations have been coupled by dedicated lines of 1 MHz or so. With the spread of the utilization of the Internet, however, various sorts of networks and various sorts of terminals have come to be connected. Concretely, networks of comparatively narrow bandwidths based on radio systems or the dial-up PPP (Point-to-Point Protocol) have increased in addition to the private LANs. Herein, the radio networks differ from the conventional networks, not only in the narrow bandwidths, but also in mobile serviceabilities. Regarding the terminals, whereas desktop type terminals have hitherto formed the mainstream, personal computers of notebook type (Laptop type) and portable terminals being still smaller in size and lighter in weight have recently come into wide use.

The offer of WWW (World Wide Web) contents on the Internet in the prior art has been premised on the use of the networks and terminals which are uniform to some extent. That is, the contents have been offered to any of the networks and any of the terminals quite similarly (without considering differences in the transmission rates of the networks or differences in the processing capabilities of the terminals).

Although there has heretofore been a technique for controlling data between two points, for example, between the terminal and a server, there has not been any technique for controlling data among many points distributed within the network. The technique for the data control between the two points is stated in, for example, Japanese Patent Application No. 08-036095.

The prior art has the problem that, when the narrow-band network such as radio network is used, a long communicating time period is required for sending out data of comparatively large size such as image data. Another problem is that, when the portable terminal or the like is used, an image sent in cannot be entirely displayed. Still another problem is that, since the uniform networks are assumed, wasteful data which cannot be displayed are caused to flow through the networks in large quantities.

Moreover, the prior art has the problem that, in the network using the radio system, the line utilization factor of the network worsens, so the frequency resources thereof are wasted.

SUMMARY OF THE INVENTION

An object of the present invention is to provide in a computer network, a communication control system of distributed control type in which data to be transmitted is adaptively varied in consideration of the transmission characteristics of individual networks and the processing capabilities of reception terminals.

In the present invention, a communication system for a computer network having different networks, comprises agent unit for communicating with one another, thereby to perform communication controls of communication data which are exchanged through the computer network; gateway unit for connecting the different networks, each of said gateway unit including agent platform unit for accepting and running at least one of said agent unit; and terminal unit each including at least one of said agent unit, for performing data communication through said computer network; so that the first agent unit run in the gateway unit and the second agent unit run in the terminal unit acquire information on said terminal unit and information on a situation of the connected network, as well as a change of the situation, respectively, and that the first and second agent unit cooperate while exchanging the information items respectively acquired, whereby the data communication is performed in adaptation to situations of said terminal unit and said computer network, as well as changes of the situations.

In the communication system of the present invention for the computer network as stated above, the plurality of agent units are distributed and cooperate, whereby the respective agent unit sense the situations of the terminal unit and the computer network, as well as the changes thereof. Subsequently, the gateway unit coupling the different networks controls (processes or/and accumulates) the communication data, for example, the multimedia contents of the WWW (World Wide Web) so as to execute data transfer in accordance with the situations of the terminal unit and the computer network, as well as the changes of these situations.

According to such an architecture, unnecessary communication data other than data required by the performance of terminals can be deleted. It is therefore possible to attain the functional effects that frequency bandwidths in the computer network can be effectively utilized, and that the occurrence of congestion states is suppressed.

BRIEF DESCRIPTION OF THE DRAWINGS

FIGS. 4A and 4B are diagrams for explaining the encapsulation of the facilities of an agent etc. and distributed object environments where the agent etc. operates, the facilities and the environments being presumed in the embodiments of the present invention, respectively;

FIG. 6 shows an example of the format of an agent site management table;

FIG. 8 is a flowchart showing the process of discrimination unit included in the agent manager;

FIG. 10 is a flow chart showing the process in which image data to be transmitted from the server to the client are converted by the gateway;

FIG. 12 is a block diagram for explaining a system architecture which serves to implement the facility of the virtual proxy server.

DESCRIPTION OF THE PREFERRED EMBODIMENTS

Figure 1:
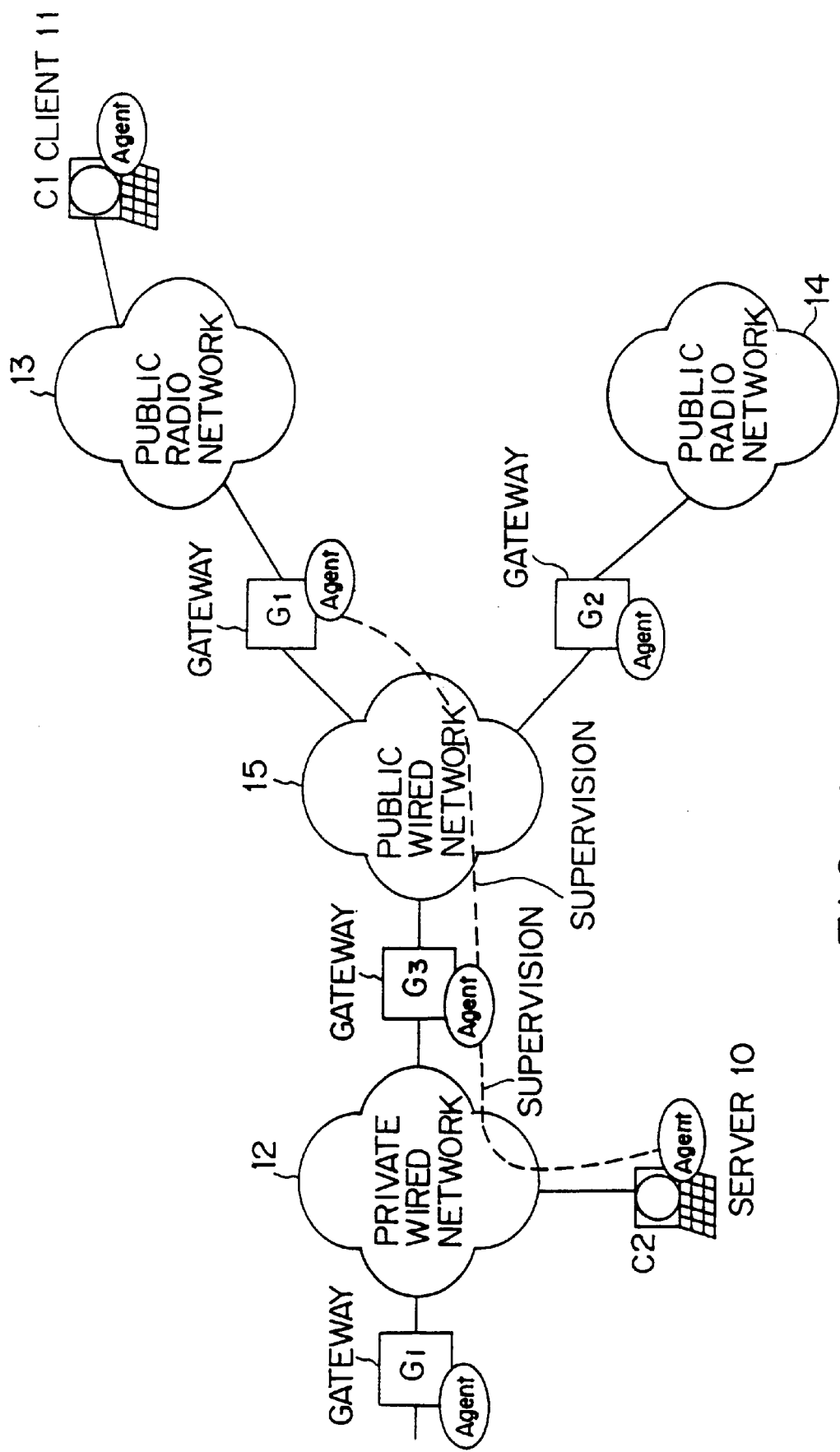
FIG. 1 is a diagram for explaining a method of sensing the situations of a terminal and a network in a computer network in the first embodiment of the present invention.

FIG. 1 is a diagram for explaining a method of sensing the situations of a terminal and a network in a computer network in the first embodiment of the present invention.

The computer network illustrated in FIG. 1 has an architecture in which a private wired network 12, a public wired network 15, and public radio networks 13 and 14 are interconnected through gateways G3, G1 and G2. The private wired network 12 is a LAN or the like which is installed in an enterprise, a university or the like. A server 10 which offers information such as WWW contents, is connected to the private wired network 12. On the other hand, the terminal C1 of a client 11 who wishes to access the server 10 and to acquire the information is assumed in FIG. 1 to be connected to the public radio network 13 through a radio channel. In this case, the client 11 owns a portable terminal or the like and performs data communication by the use of, e. g., the channel of the portable telephone. Of course, the present invention is similarly applicable even in a case where the client 11 owns a desktop type personal computer installed in a specified place and where the personal computer is connected to the public wired network 15 through a telephone line or the like.

The gateways G1, G2 and G3 interconnect the public wired network 15, public radio networks 13 and 14, and private wired network 12 which differ in properties such as transmission rates and in communication protocols etc. Thus, each of the gateways G1, G2 and G3 forms a data communication interface from one network to another. The private wired network 12 can also be arranged so as to be connected to a gateway Gi and then to an unshown network, which shall not be explained more.

In the embodiment of the present invention, facilities (or programs) for mutual information exchanges, called "agents", are run beforehand in the terminals (the respective terminals C1 and C2 of the client 11 and the server 10) and the gateways G1, G2, G3 and Gi. The agents are constructed so as to fulfill different functions, depending upon the respective operating environments of the server 10, client 11, and gateways G1, G2, G3 and Gi. Information items such as the bandwidths of the networks to which the gateways G1, G2, G3 and Gi are connected, are prestored in the respective agents which are run in these gateways. Further, the respective agents of the gateways G1, G2, G3 and Gi dynamically sense the current situations (such as the bandwidths) of the networks by means of, e. g., dummy communications with the agents of the adjacent ones of these gateways. By way of example, the gateways G1, G2 and G3 exchange dummy packets or the likes with one another, thereby to acquire the information items, such as bandwidths, of the public wired network 15.

Meanwhile, the agents which are run in the terminals (C1, C2) report the properties of these terminals (such as the sizes of displayable screens), the priority levels of the client user in the use of resources, and whether or not these terminals are connected to the associated networks, to the agents of the corresponding gateways G1 and G3. In FIG. 1, the agent operating in the terminal C1 of the client 11 transmits the information on this terminal C1 to the agent of the gateway G1. On the other hand, the agent operating in the terminal C2 of the server 10 transmits the information on this terminal C2 to the agent of the gateway G3. Further, the above information items are exchanged between the agents of the gateways G1 and G3, so that the respective agents of the gateways G1 and G3 which exist in a path extending from the terminal C1 of the client 11 to the terminal C2 of the server 10 can obtain the information items on the terminals C2 and C1.

Incidentally, such exchanges of the information items by the agents are basically executed automatically without the intervention of an operator (man).

In this way, the agents of the gateways G1 and G3 can know the types of the two terminals C1 and C2 (the properties thereof), the characteristics of the networks through which these terminals communicate, and so forth.

The advantage of this embodiment is that the information items of the terminals, the resource priority levels of the user (client 11) and the situations of the networks, which cannot be found by the schemes of present-day computer networks, can be found to realize the communication of data in which the found matters are taken into consideration.

It is permitted by sensing the information of the terminal to convert data which is to be sent to this terminal, into data which is suited to this terminal. By way of example, an image converting function is performed in a certain gateway (G1 or G3). The expression "image converting function" here signifies the conversion of image data conformed to the size of the display screen of the terminal. The image converting function of the gateway (G1 or G3) may be based on any known technique. In case of scaling down an image, the function executes such a process as thinning out pixels in accordance with a predetermined method. Besides, in case of transmitting only part of an image, the part of the image to be transmitted is set by a predetermined method, and an image of predetermined size is thereafter extracted from the original image in the light of the information on the display screen of the terminal, so as to transmit the extracted image.

Even when data generated by the terminal C2 of the server 10 forms an image of 640×480 pixels, the original image cannot be faithfully reproduced by the terminal C1 of the client 11 assumed to have a display capability of 320×240 pixels. The client 11 is therefore permitted to choose viewing only the part of the original image or viewing the scaled-down image.

Here, when the scale-down of the image has been chosen, it is implemented by the image converting function of the gateway (G1 or G3), and the image of the 320×240 pixels is sent to the terminal. This contrivance is effective in the display of the terminal. Moreover, the amount of data becomes smaller than that of the original image data after the image conversion, so that the volume of traffic on a path which extends from the gateway (G1 or G3) having the image converting function, to the client 11, can be sharply reduced.

The resource priority levels of the user (client 11) can be implemented in such a way that (a) the scale-down or (b) the partial display in the image conversion is prestored in the agent of the terminal C1 of the user (client 11). Besides, whether a data-transfer time period or an image quality is preferential may be prestored, too. In this case, in the gateway G1 or G3, the data-transfer time period is calculated on the basis of the image data and the actual transfer rates of the networks 12, 15 and 13, and it is judged if the calculated time period satisfies a condition designated by the user (client 11).

By way of example, it is assumed as the designated condition of a certain user (client 11) that data be transferred within x seconds as to any desired image. In case of sending data of z bytes by the network which has a transfer rate of y bps. (this indicates that the transfer rate of the network of the lowest transfer rate among the private wired network 12, public wired network 15 and public radio network 13 is y bps.), a time period of w=z×8/y seconds is required. (In actuality, a longer time period is required because of parity bits, packets for verification, etc.) Here, when w>x holds, the quality of the image is lowered in transferring the data thereof. Lowering the image quality is implemented by the image converting function installed in the gateway (G1 or G3).

Sensing the situation of the network (the whole network which includes the private wired network 12, public wired network 15 and public radio network 13 and the gateway G1 or G3) is effective for the communication reflecting the situation of the network as explained in relation to the resource priority levels of the user. In particular, dynamic sensing (in which the agents communicate with each other at predetermined time intervals, thereby to continually supervise the states of the networks) is very effective for the network whose situation changes every moment, such as radio network.

Figure 2:
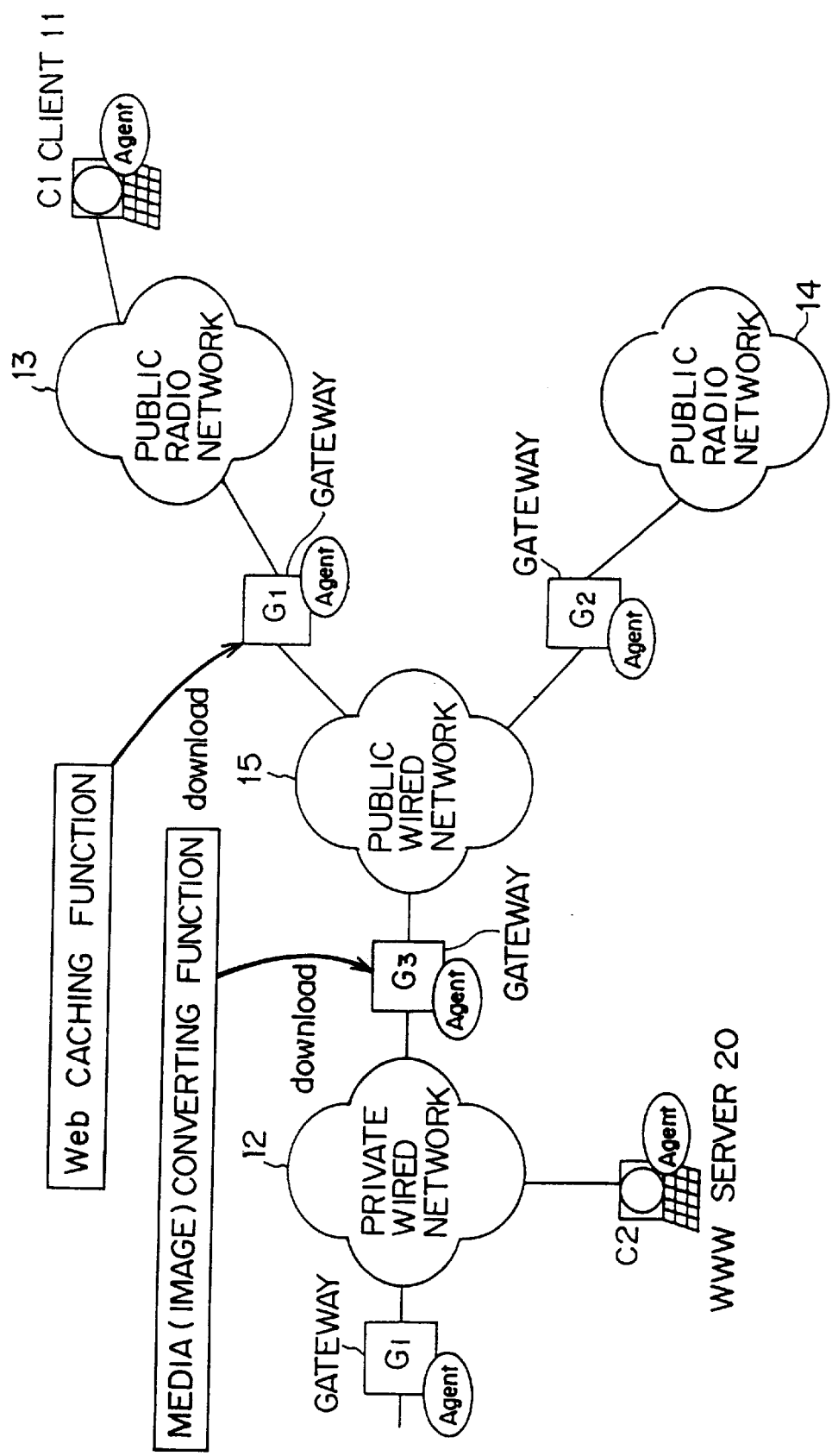
FIG. 2 is a diagram for explaining a computer network in the second embodiment of the present invention, the computer network being such that multimedia data (animation etc.) are transferred between a server and a client.

FIG. 2 is a diagram for explaining a computer network in the second embodiments of the present invention, the computer network being such that multimedia data (animation, voice, etc.) are transferred between a server and a client.

The architecture of the computer network shown in FIG. 2 is basically the same as in FIG. 1, and is different in that a terminal C2 is the WWW server 20 generating the multimedia data. The other constituents which are the same as in FIG. 1 are denoted by the same reference numerals or symbols.

It is assumed by way of example that the terminal C2 be the WWW server 20, while a terminal C1 be of the client 11. Here, when the terminals C1 and C2 are to perform data communication therebetween, data are passed through three different networks (a private wired network 12, a public wired network 15 and a public radio network 13) and are passed through two gateways G1 and G3 meantime.

In this case, the function of deleting wasteful communication data is arranged in the gateway (GI or G3). Here, the expression "wasteful communication data" signifies image data etc. which is not normally displayed on the terminal C1 even when transferred, on account of the conditions of the transferring capabilities of the networks, the processing capability of the terminal C1 of the client 11, etc. as explained in conjunction with FIG. 1. Deleting the wasteful communication data corresponds to the execution of such a process as thinning out pixels in an image which is not normally displayed.

In this embodiment, data is cached in the gateway (G1 or G3). More specifically, the gateway (G1 or G3) has a memory for temporarily accumulating the data sent from the WWW server 20. The data caching is such a function that, in a case where a data request made by the client 11 agrees with a request made within a predetermined term in the past, the data accumulated in the memory is delivered to the client 11 without sending a new request to the WWW server 20.

Regarding the position of the caching function in the computer network, this caching function is usually arranged in the gateway G1 by reason that useless communication can be reduced more as the function is nearer to the client 11. Of course, the terminals of many clients are really connected to the computer network, and gateways nearest to the terminals of the clients are caused to cache data for these client terminals. It is necessary therefor to grasp the architecture of the whole network, and this is implemented by an agent manager to be stated later.

Further, the image converting function as stated before is installed in the gateway G1 or G3. Here in this embodiment, the image converting function is installed in the gateway G3 which is nearest to the WWW server 20. Thus, unnecessary data is prevented from flowing between the gateway G3 and the terminal C1 of the client 11.

In each of the first and second embodiments, there has been mentioned the method in which the data is converted in accordance with the situation of the whole network and the resource priority levels of the user (client 11). The network having the narrowest band and the gateway for executing the data conversion are not always connected between two terminals. Concretely, in FIG. 2, the data converting function should optimally be run in the gateway G3 from the viewpoint of reducing unnecessary traffic. However, in a case where the bandwidth of the public radio network 13 lying between the gateway G1 and the terminal C1 is narrower than that of any other network, the data converting function of the gateway G3 needs to know the bandwidth of the public radio network 13. Therefore, the agents of the gateways included in the communication path are able to perform the functions of reporting the information items of the associated networks to each other. Thus, the information items of the networks can be effectively utilized.

Figure 3:
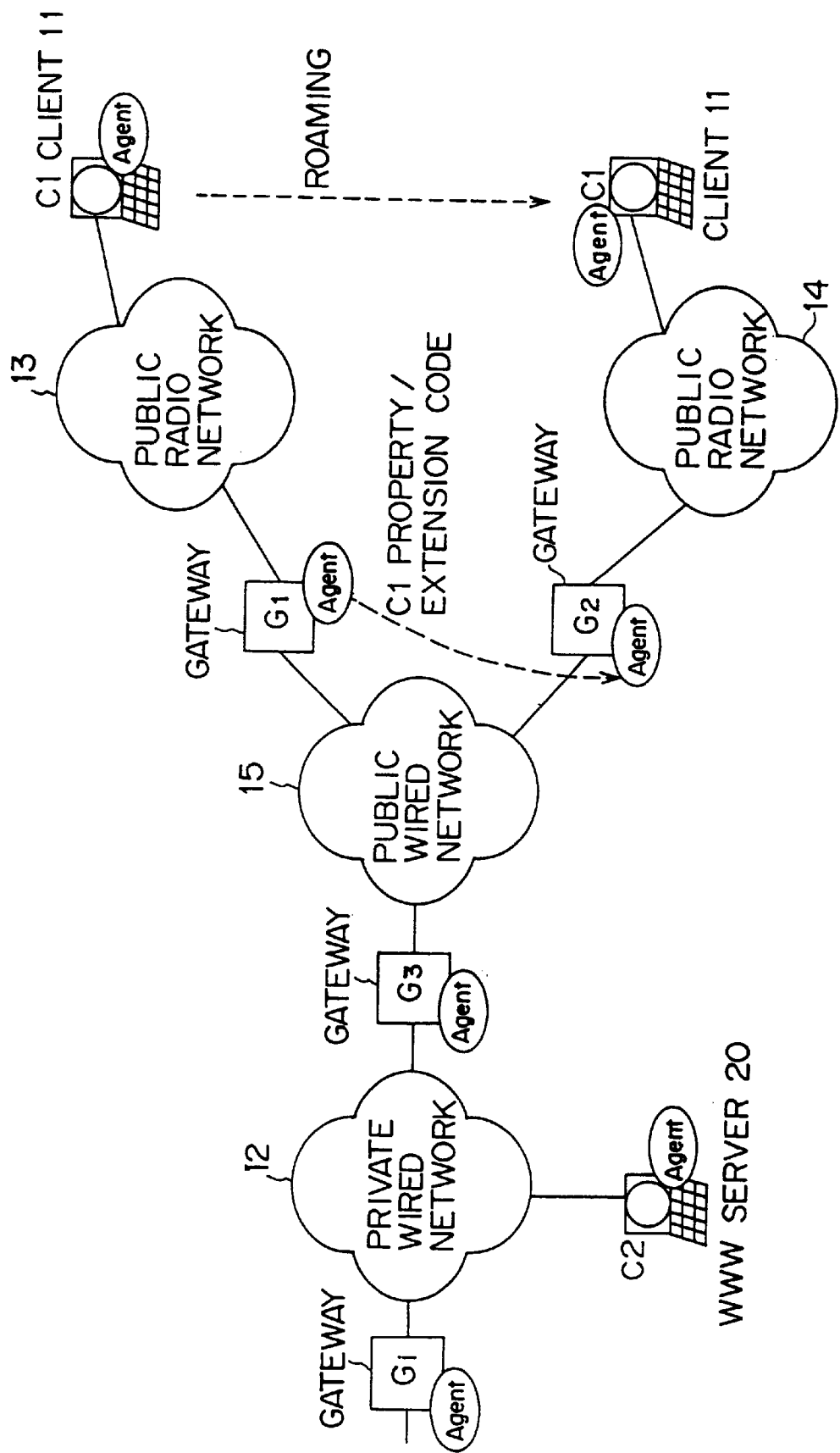
FIG. 3 is a diagram for explaining a computer network in the third embodiment of the present invention, and showing a case where the terminal of a client roams.

FIG. 3 is a diagram for explaining a computer network in the third embodiment of the present invention, and showing a case where the terminal of a client roams.

Also in this embodiment, the architecture of the computer network is similar to that of the computer network in each of the foregoing embodiments. That is, the computer network in this embodiment includes a private wired network 12, a public wired network 15, public radio networks 13 and 14, gateways G1, G2 and G3 for connecting these networks, and a gateway Gi. By the way, in FIG. 3, the same constituents as in FIG. 1 or FIG. 2 bear the same reference numerals or symbols.

It is assumed that the client 11 be first accessing a WWW server 20 through the public radio network 13. Accordingly, the agent of the gateway GI is communicating with an agent run in the terminal C1 of the client 11, thereby to acquire the information items of the processing speed of the terminal C1, the allowable data-transfer speed thereof, and so forth. Since, however, the terminal C1 is a portable terminal or the like using a radio channel, the network to which it is connected might change from the public radio network 13 to the public radio network 14 with the movement of the client 11 (user).

On such an occasion, the network path between the two terminals (the WWW server 20 and the client 11) changes. Then, the function (the agent itself) having operated in the gateway G1 or the properties retained in the gateway G1 (the information items obtained by the communication with the agent operating in the terminal C1) is moved to the gateway G2. Thus, it is permitted to always arrange the optimal function on the optimal path and to effectively use the resources of the computer network.

In the above embodiment, the communicating functions of the terminals C1 and C2 and the gateways G1–G3 are controlled by the agents installed in the respective constituents. Herein, each of the agents should desirably be encapsulated so as to install the capsule in the corresponding terminal or gateway. In this way, the agent itself can be moved through a communication path.

The above embodiment has referred to the example in which the image is converted in accordance with the network information. Mentioned as another embodiment is data compression which conforms to data contents and a transmission line. By way of example, in case of transmitting image data over a radio channel, the data is compressed by reason that the image data are generally judged to have a very large amount of data.

In case of sending data to a client, an error control method is adaptively altered in accordance with whether the data transfer quality of the transmission line of a network leading to the client is good or bad. By way of example, in a case where an intermediate transmission line is a wired channel, it is generally judged to have the good data quality, and hence, only a retransmission control is applied with a packet size held larger. On the other hand, in a case where a radio channel is included midway, it is judged to have the bad data quality, and hence, an intense error correction is applied with the packet size made smaller, whereupon the retransmission control is performed.

FIGS. 4A and 4B are diagrams for explaining the encapsulation of the facilities of an agent etc. and distributed object environments where the agent etc. operate, the facilities and the environments being presumed in the embodiment of the present invention, respectively.

FIG. 4A illustrates the concept of the encapsulation.

A program module 41 contains programs for the processes which are executed by the agent themselves in each of the foregoing embodiments. Only the program module 41 may exist in a case where it is installed in the terminal or the gateway and lies in an operable state.

Herein, however, a program operation environment 42 for the operation of the program module 41 is put together with this program module 41 and is constructed as one object beforehand. Thus, in case of running the program module 41, the program operation environment 42 is first started to set the environment where the program module 41 can operate.

A capsule 40 in which the program module 41 is combined with the program operation environment 42 as stated above, is used as a transfer unit. Accordingly, even in a case where the destination of transfer does not have the operating environment of the program module 41, the environment where the program module 41 is operable can be set by running the capsule 40 so as to start this program module 41.

In this manner, the "encapsulation of functions" signifies that a certain function is combined with an environment for the operation of the program so as to operate even solely. In a "telescript" by way of example, a program counter, a stack pointer, etc. are put together with a program. Such a contrivance is necessitated especially for moving the program which is operating.

FIG. 4B illustrates a case where the distributed object environments are installed in the computer network.

In the case where the computer network is furnished with the distributed object environments in this manner, naturally the terminals and the gateways are furnished with the distributed object environments. Accordingly, in a case where the agent to be run in each of the terminals and gateways is constructed beforehand so as to operate in the distributed object environment, it is dispensed with to transfer the program operation environment 42 together with the program module 41 when this program module 41 is moved, as in the expedient of FIG. 4A. With the expedient of FIG. 4B, accordingly, any program operation environment for the operation of the program module 41 need not be put together into a capsule in a case where a transfer source and a transfer destination include the distributed object environments 43 in common and where the movement of the program module 41 during the operation thereof is not especially required. It is therefore possible that, as shown in FIG. 4B, only the program module 41 be transmitted from the transfer source to the transfer destination so as to operate in this transfer destination.

Figure 5:
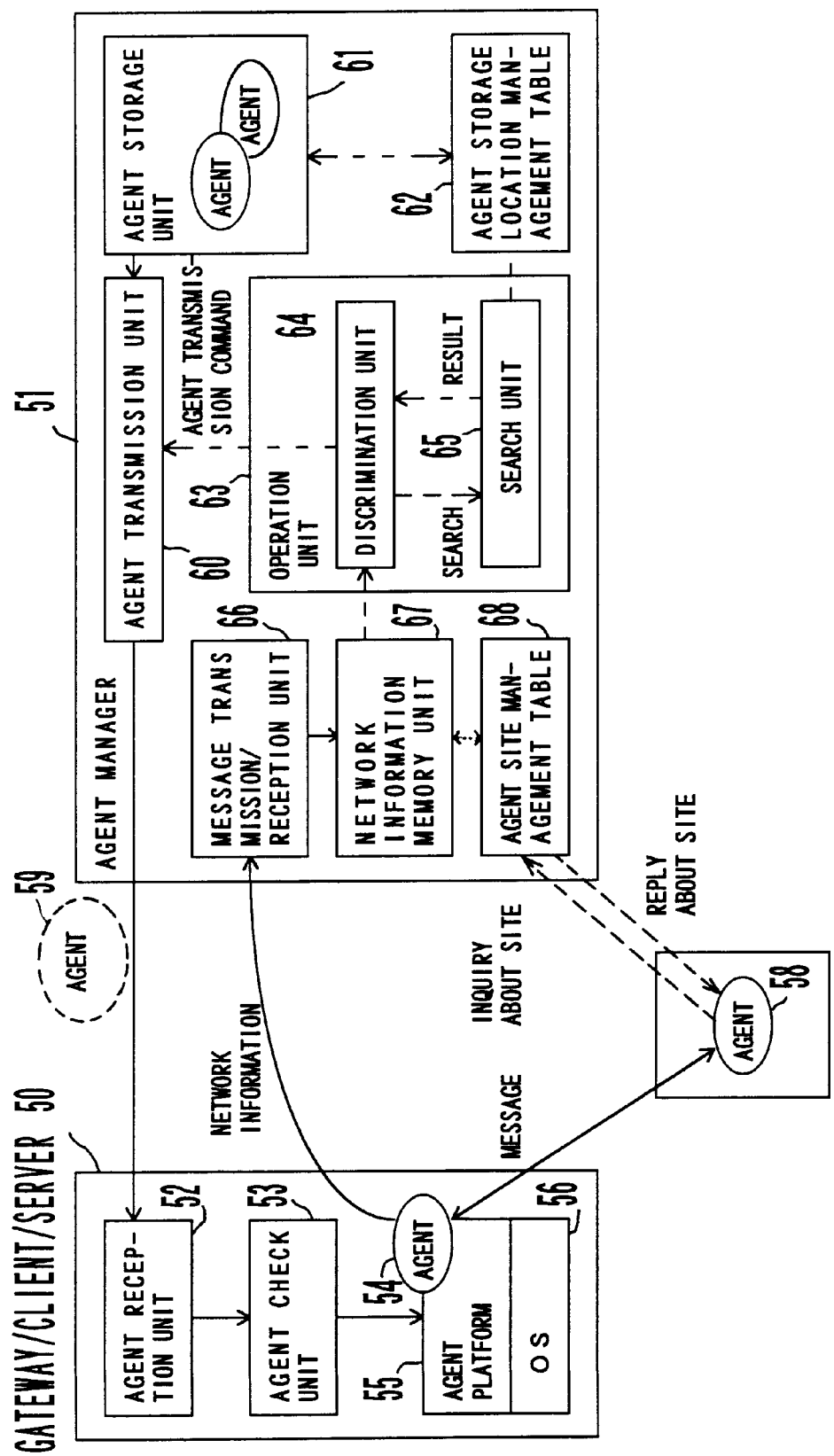
FIG. 5 is a block diagram showing the common constructions of a gateway, a client and a server each of which includes the agent for incarnating the function of controlling communication data, and the construction of an agent manager which controls the agent.

FIG. 5 is a block diagram showing the common constructions of a gateway, a client and a server each of which includes an agent for incarnating the function of controlling communication data, and the construction of an agent manager which controls such agents. (In the ensuing description down to FIG. 10, the terminal of the client shall be expressed merely as the "client".)

The functions of controlling the communication data in the terminals (the terminal of the client 11, and the terminals of the servers 10 and 20) and the gateways G1, G2 and G3 in the first to third embodiments are incarnated as encapsulated agent programs. The agents are managed by, for example, the agent manager 51 which exists in one server disposed in the computer network.

The gateway, client or server 50 is configured with a agent reception unit 52, an agent check unit 53, an agent platform 55 and an OS (operating system) 56.

The agent reception unit 52 is a unit for receiving the agent 59 which is transmitted from the agent manager 51. The agent 59 received by the agent reception unit 52 is delivered to the agent check unit 53. Then, the agent check unit 53 decides whether or not the transmitted agent 59 is proper (or legal). On condition that the agent 59 is improper (or illegal), it is discarded. In contrast, on condition that the agent 59 is proper, it is delivered to the agent platform 55 being the operating environment thereof and is run as the agent 54.

The agent platform 55 is constructed so as to operate on the OS 56. By way of example, in a case where the agent is constructed as the Applet of Java, the agent platform 55 may be an environment where a WWW browser operates.

Likewise, the agent 58 is also sent to and run in the gateway, client or server 57.

The agent manager 51 is installed in one server within the computer network as stated before. This agent manager 51 includes agent storage unit 61, in which the agents are stored. The locations of the agents are managed by an agent storage location management table 62.

Operation unit 63 is configured with a discrimination unit 64 and search unit 65. In a case where the agent needs to be transmitted to, e. g., the gateway, the discrimination unit 64 judges the necessity of acquiring information on the structure of the network and requests the search unit 65 to search for the corresponding agent. Upon receiving the request, the search unit 65 refers to the agent storage location management table 62 in order to know where the agent to be transmitted is stored within the agent storage unit 61. The discrimination unit 64 receives the result of the reference, and issues a transmission command to agent transmission unit 60. Then, the agent transmission unit 60 reads out the corresponding agent from the agent storage unit 61 and transmits this agent to, e. g., the gateway.

When the agents 54 and 58 have been respectively installed in the gateway, client or server 50 and 57, they communicate with each other and acquire the information items on the networks. The acquired information items on the networks are transmitted to the agent manager 51 as a message, and are received by the message transmission/reception unit 66. Subsequently, the message transmission/reception unit 66 extracts network information items from the received message and stores them in network information memory unit 67. Further, information items indicating the sites of the respective agents are extracted from the network information items, and they are logged in an agent site management table 68. Besides, the discrimination unit 64 fetches the network information from the network information memory unit 67, and it commands the agent transmission unit 60 to transmit the agent to the gateway, client or server requiring the agent anew.

The agent manager 51 acquires information on the network structure from the network by using, for example, the SNMP (Simple Network Management Protocol). Subsequently, the agent manager 51 computes an appropriate one of the gateways and terminals (the terminals of the client and server) from the acquired network structure information, and it transmits the agent to the computed constituent. Alternatively, the agents may be kept resident in the terminals (of the server and client) and the gateways beforehand.

The transmitted agent acquires the network information, such as bandwidth, of the network to which the pertinent gateway or terminal (of the client or server) is connected. As a concrete example, the agent transmits a dummy packet to the associated network and computes a time period since the time of the transmission till the time at which the dummy packet is received again, thereby to measure the transmission rate of the network.

Besides, the agent of the client acquires the size and resolution of a terminal screen, resource priority levels, etc. As a concrete example, the acquisition of the information items is incarnated by loading data from a setting file of predetermined format (a file in which necessary information items are recorded in a predetermined form). The agent of the server acquires information on, e. g., to which network the server is connected.

The agents of the gateways, server and client notify the agent manager 51 of the corresponding network information items and their own sites. They also notify any other agent of the network information items and the sites in compliance with a request made by the other agent. The agent manager 51 further operates to add, delete and move the agents on the basis of such network information.

In the foregoing case of moving the communication control function or the properties, each of the gateways, server and client possesses the agent platform 55 and the agent reception unit 52, and the agent manager 51 delivers the agents to the pertinent ones of the gateways and terminals (of the server and client). Incidentally, each of the gateways, server and client may also include an agent transmission unit. The agent platform 55 may well be a distributed object environment of, for example, CORBA (Common ORB Architecture), HORB, or Java RMI (Java Remote Method Invocation specification). In the distributed object environment, only part of the function module (method) can be delivered besides the transmission of the agent itself.

In order to find the optimal communication path between the two terminals (between the client and the server), information on the structure (topology) of the network is first acquired from the rooter (gateway) in the network. As a concrete example, it is acquired using the SNMP. The acquired information is combined with network information such as the bandwidth of a section extending between the gateways, the bandwidth being acquired by the agents which are arranged in these gateways. Thus, the optimal communication is found.

FIG. 6 shows an example of the format of the agent site management table 68.

The agent manager 51 needs to manage the sites of individual agents for the purpose of adding, deleting and moving the agents in accordance with network information. It is the agent site management table 68 that is provided for the purpose.

In the agent manager 51, by way of example, the identifier of each of the agents is expressed by a machine name, domain name and agent name, and it is managed by agent management No.

The site of each agent is expressed by, for example, an IP address and the agent management No.

Accordingly, the agent site management table 68 is formed of, for example, a table which converts the identifier of each agent into the (IP address+agent management No.).

In the example of FIG. 6, the identifiers of the agents each being composed of the (machine name+domain name+agent name) are entered in a column 70, while the sites each being composed of the (IP address+agent management No.) are entered in a column 71 in correspondence with the identifiers.

By way of example, in the uppermost row of the table in FIG. 6, the column 70 bears "machine1" as the machine name, "domain1" as the domain name and "agent1" as the agent name. On the other hand, the column 71 bears "123.234.56.78" as the IP address and "111" as the agent management No.

Figure 7:
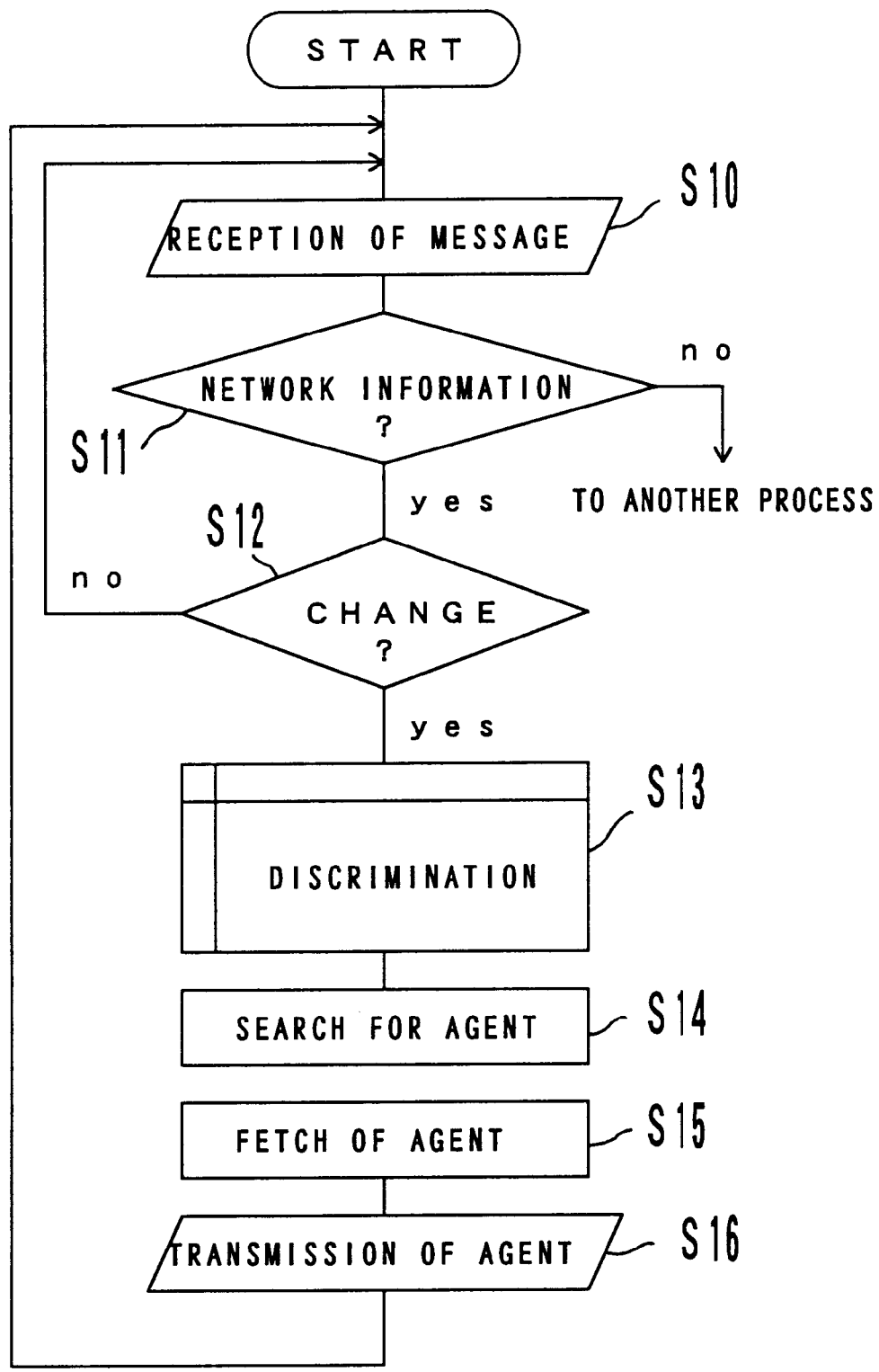
FIG. 7 is a flowchart showing the process of the agent manager.

FIG. 7 is a flowchart showing the process of the agent manager 51.

The agent manager 51 operates to receive network information from the agents of the gateways, server and client, to discriminate the optimal arrangement place or function of the agent in accordance with the sites of the agents and the type of the terminal in the presence of any change, to search the agent storage unit 61 for the required agent and fetch this agent, and to deliver the fetched agent to the optimal place.

First, when the agent manager 51 is started, it waits the reception of any message from any of the agents at step S10. When any message has been received, whether or not the content of the message is the network information is judged at step S11. In a case where the message content is not the network information, another process based on the message content is executed. Here, since the process is not directly pertinent to the embodiment, it shall be omitted from this description.

In a case where the message content has been judged as the network information at step S11, whether or not the network information has undergone any change is judged at step S12. The judgement on the change of the network information can be made in such a way that the network information received in the last cycle is stored in the network information memory unit 67, whereupon it is compared with the network information received anew.

On condition that the absence of the change of the network information has been judged at step S12, the processing flow returns to step S10, at which the agent manager 51 waits the reception of any message. In contrast, on condition that the presence of the change of the network information has been judged at step S12, the processing flow advances to step S13, at which the optimal arrangement place or function of the agent is discriminated in accordance with the sites of the agents and the type of the terminal by the discrimination unit 64.

When the agent to be transmitted has been discriminated, the agent storage location management table 62 is searched for the agent by the search unit 65 at step S14. At step S15, the agent is fetched from the agent storage unit 61 by the agent transmission unit 60. Further, at step S16, the agent is transmitted to the desired place by the agent transmission unit 60. Thereafter, the processing flow returns to step S10.

FIG. 8 is a flowchart showing the process of the discrimination unit 64 included in the agent manager 51.

The agent manager 51 receives the message from the agent by the message transmission/reception unit 66, and stores it in the network information memory unit 67. The discrimination unit 64 judges whether or not the network information stored in the network information memory unit 67 is of the client, at step S17. Subject to the client's network information, whether or not the client has roamed is judged at step S18. In a case where the client has not roamed, another process is executed. Here, since the other process is not directly pertinent to the embodiment, it shall be omitted from description.

In a case where the roaming of the client has been judged at step S18, information on the network is fetched from the network information memory unit 67, and the gateway nearest to the place where the client lies currently is found (step S19). When the gateway nearest to the current place of the client has been found, whether or not the agent exists in this gateway is judged at step S20. The judgement is made by referring to the agent site management table 68.

In the presence of the agent in the particular gateway, the processing flow advances to step S22. On the other hand, in the absence of the agent, this agent stored in the agent storage unit 61 is transmitted to the particular gateway through the agent transmission unit 60 at step S21, whereupon the processing flow advances to step S22. Here at step S22, a command is given for executing the data caching stated before by employing a memory not shown in FIG. 5. Thereafter, the processing flow returns to the step S17, at which the discrimination unit 64 stands by for the next processing.

Meanwhile, when it has been judged at step S17 that the agent having sent the message is not of the client, the processing flow advances to step S23, which serves to judge whether or not the message has been sent from the agent which is installed in the server transmitting an image. In case of the judgement that the message is not of the image transmitting server, another process corresponding to the content of the message is executed. Here, since the process is not directly pertinent to the embodiment, it shall be omitted from this description.

In case of the judgement at step S23 that the message is of the image transmitting server, the gateway nearest to the server is found in the same way as explained at step S19 (step S24). Subsequently, whether or not the agent exists in the found gateway is judged (step S25). In the presence of the agent in the particular gateway, the processing flow advances to step S27. On the other hand, in the absence of the agent in the particular gateway, this agent stored in the agent storage unit 61 is transmitted to the particular gateway through the agent transmission unit 60 at step S26, whereupon the processing flow advances to step S27.

At step S27, a command is given for activating (or starting) the image converting function which is installed in the gateway. Thereafter, the processing flow returns to step S17. As stated before, the image converting function is a process which thins out pixels from image data or extracts only part of an image by utilizing any known technique.

Figure 9:
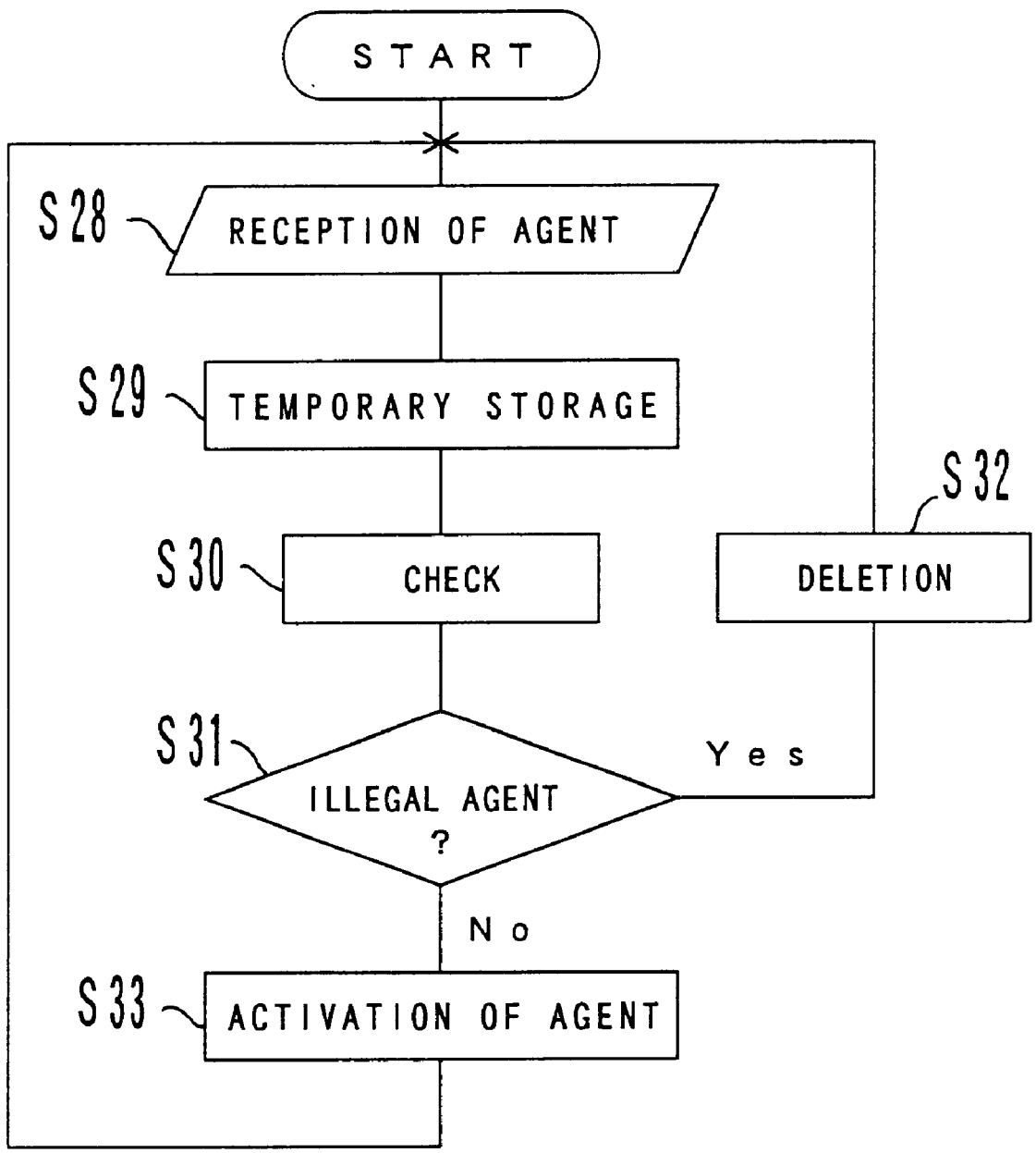
FIG. 9 is a flow chart for explaining an agent accepting process which is executed in each of the gateway, client and server.

FIG. 9 is a flow chart for explaining an agent accepting process which is executed in each of the gateway, client and server 50.

The process illustrated in FIG. 9 is performed by the agent reception unit 52, agent check unit 53 and agent platform 55 which are shown in FIG. 5.

First, the agent reception unit 52 receives the agent at step S28. Then, the received agent is temporarily stored at step S29. Subsequently, the agent check unit 53 checks the temporarily stored agent at step S30, and whether or not the agent is proper (or legal) is judged at step S31.

This step S31 is executed to judge whether or not the agent is one for a communication control as sent from the agent manager 51 because what program is sent in as the agent, is not known. Without such processing, virus etc. transmitted as the agent might be accepted. Therefore, the processing of step S31 is carried out.

In a case where the received agent has been judged improper (or illegal) at step S31, the agent check unit 53 deletes this agent at step S32, followed by step S28 at which the reception of the next agent is waited by the agent reception unit 52. On the other hand, in a case where the received agent has been judged proper at step S31, this agent is activated (or started) under the operating environment of the agent platform 55 (step S33). Thereafter, the processing flow returns to step S28 so as to make ready for the reception of the next agent.

FIG. 10 is a flow chart showing the flow of a process in which image data to be transmitted from the server to the client are converted by the gateway.

First, when the gateway has known from the network information etc. that the terminal of the client is incapable of satisfactorily displaying the image data to-be-received, it transmits a menu for image conversion to the terminal of the client at step S34. Then, the gateway waits the reception of a choice menu item from the client at step S35.

When the choice menu item has been received from the client at step S35, whether or not the content of the choice menu item is the partial display of an image is judged at step S36. On condition that the choice menu item is the partial display of the image, the flow advances to step S37, at which part of the image data is transmitted to the client. Then, the process is ended.

In contrast, on condition that the content of the choice menu item received at step S36 is not the partial display of the image, whether or not the content of the choice menu item is the scale-down display of the image is judged at step S38. Subject to the judgement that the content is not the scale-down display of the image, this content is decided to be an input which is not contained in the menu transmitted from the gateway, and a message which indicates the occurrence of an error in the menu item choice is transmitted to the client at step S46. Then, the flow returns to step S34 so as to the process from the transmission of the menu.

Subject to the judgement at step S38 that the scale-down display of the image has been chosen, the image is scaled down at step S39. The image scaling-down may be resorted to a known technique, and the pixels of the image are thinned out in accordance with a predetermined method by way of example. A scaled-down image is subsequently transmitted to the client at step S40, whereupon the process is ended.

On the side of the client, the reception of the menu from the gateway is first waited (step S41). Subsequently, when the menu has been received, it is displayed, and the user of the client is prompted to choose a menu item (step S42). At step S43, the input of the choice menu item by the user is waited, and the choice menu item is transmitted to the gateway when input.

At step S47, the reception of the message from the gateway is waited for a predetermined time period. In a case where no message has been received in spite of the lapse of the predetermined time period at step S47, or where the message of the choice error from the gateway has been received thereat, the flow advances to step S48. This step S48 serves to judge whether or not the choice error message has been received. Subject to the reception of the choice error message, the flow returns to step S41 so as to repeat the process from the beginning.

The judgement at step S48 that the choice error message has not been received, signifies that the menu item choice has been successful. The step S48 is therefore followed by step S44, at which the reception of the image data is waited. When the image data have been received at step S44, the flow advances to step S45, at which the image is displayed.

The above description of the embodiment has referred to the case where the menu of the image processing contains only the two menu items; the partial display of the image, and the scale-down display of the image. As another menu item, the monochromatic display of the image may well be added.

In the description of the process shown in FIG. 10, it has been premised that the process is executed in the gateway which is near to the terminal of the client. Another aspect of an embodiment may well be so constructed that the first gateway near the terminal of the client receives the choice of the menu item from the client and transmits the menu item to the second gateway near the server, and that the second gateway near the server executes the process such as image compression. With this contrivance, the amount of image data which are transferred through the network can be reduced to the required minimum.

Figure 11:
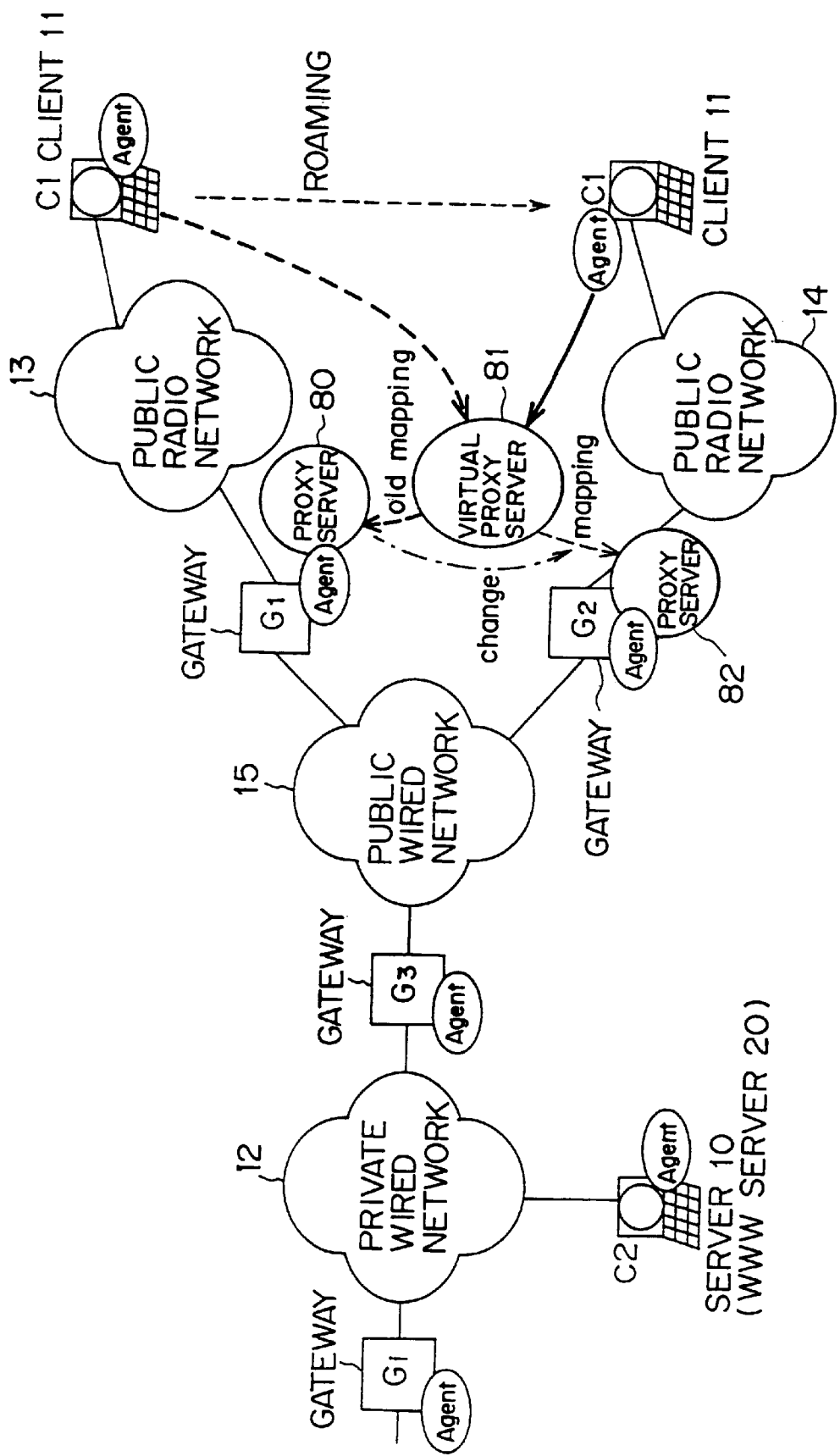
FIG. 11 is a diagram for explaining a computer network in the fourth embodiment of the present invention, the computer network employing a virtual proxy server by which the client having roamed is treated as if it were accessing the same server.

FIG. 11 is a diagram for explaining the fourth embodiment, this embodiment employing a virtual proxy server by which the client having roamed is treated as if he/she were accessing the same server.

In FIG. 11, the same constituents as those in FIGS. 1–3 bear the same reference numerals or symbols, and detailed explanation thereof shall be omitted from this description. Here, it is assumed that the terminal C1 of the client 11 be a mobile terminal.

Usually, the Web browser of the client 11 directly designates a proxy server 80 which has a cache function etc. The "proxy server" signifies a server (or gateway) to which the client 11 is connected in accessing a server 10 through a network.

In such a case, there is the problem that, when the terminal C1 of the client 11 has roamed to alter its communication path, the optimal communication path is not guaranteed in accessing the proxy server 80. Therefore, the virtual proxy server 81 is installed in order that an application such as the Web browser may designate this virtual proxy server 81.

Gateways G1–Gi find the optimal communication path between the two terminals C2 and C1 (of the server 10 and the client 11) on the basis of information items on these terminals and the situations of networks sensed, and the gateways transfer packets sent to the virtual proxy server 81, to an actual proxy server 82. Thus, even when the application does not know the roaming of the terminal C1, it selects the optimal proxy server 80 or 82 without altering its settings.

FIG. 12 is a block diagram for explaining a system architecture which serves to implement the facility of the virtual proxy server.

It is assumed that the terminal C1 of the client 11 be first accessing the server 10 through a network 1. The terminal C1 of the client 11 includes a WWW browser 91, and a virtual proxy agent 92 which operates as a virtual proxy server. The virtual proxy agent 92 is an agent which has the same functions as those of an ordinary proxy server. When accessed from the WWW browser 91, the virtual proxy agent 92 serves to connect lines so that the terminal C1 of the client 11 may be permitted to communicate with a WWW server 96 through an access point (AP) 93, the network 1, and a proxy agent 94 installed in the actual gateway. In this manner, in the case of incarnating the virtual proxy server facility, the agent (virtual proxy agent 92) having the same functions as those of the proxy server is installed in the terminal C1 of the client 11. Thus, the WWW server 96 can be accessed from the WWW browser 91 without being conscious of the fact that the proxy server has changed on account of the roaming of the client 11.

It is assumed here that the network to which the terminal C1 is connected have shifted from the network 1 to a network 2 on account of the roaming of the client 11. Then, the virtual proxy agent 92 installed in the terminal C1 of the client 11 detects the alteration of the access point from the AP 93 to an AP 97 and detects the alteration of a network structure.

Therefore, (1) the virtual proxy agent 92 sends an inquiry about the structure of the network to the proxy agent 94 of the gateway G1 through the AP 97 as well as the network 2. In a case where the gateway G1 does not possess network information locally, (2) the proxy agent 94 inquires an agent manager 90 about the network information. As stated before, the agent manager 90 possesses information items on the networks. Therefore, (3) the agent manager 90 transfers the network structure information to the proxy agent 94. (4) The network structure information is sent from the proxy agent 94 to the virtual proxy agent 92 through the network 2 as well as the AP 97. The virtual proxy agent 92 judges whether or not the proxy server currently set (gateway G1) is optimal, by utilizing the functions as the proxy server.

Here, since the client 11 has roamed, the gateway G1 is no longer the optimal proxy server. Therefore, (5) the virtual proxy agent 92 finds the optimal proxy server (gateway G2 having a proxy agent 98) and accesses the server 10 through this gateway G2.

In the above, the proxy agents 94 and 98 indicate the functions of the respective gateways G1 and G2 being the proxy servers, as the agents.

Besides, in a case where the virtual proxy agent 92 judges the gateway G2 to be the optimal proxy server, it utilizes the network structure information acquired from the agent manager 90 before.

As an alternative contrivance, the mapping between access points (specified by telephone Nos. by way of example) and the optimal gateways (proxy servers) in the cases of accessing the server 10 by the use of the access points is prestored as a table or the like in the terminal C1 of the client 11. When the client's terminal C1 has been connected to a certain one of the access points, the optimal gateway may well be found in view of the stored table so as to connect the terminal C1 to this gateway.

Figure 13:
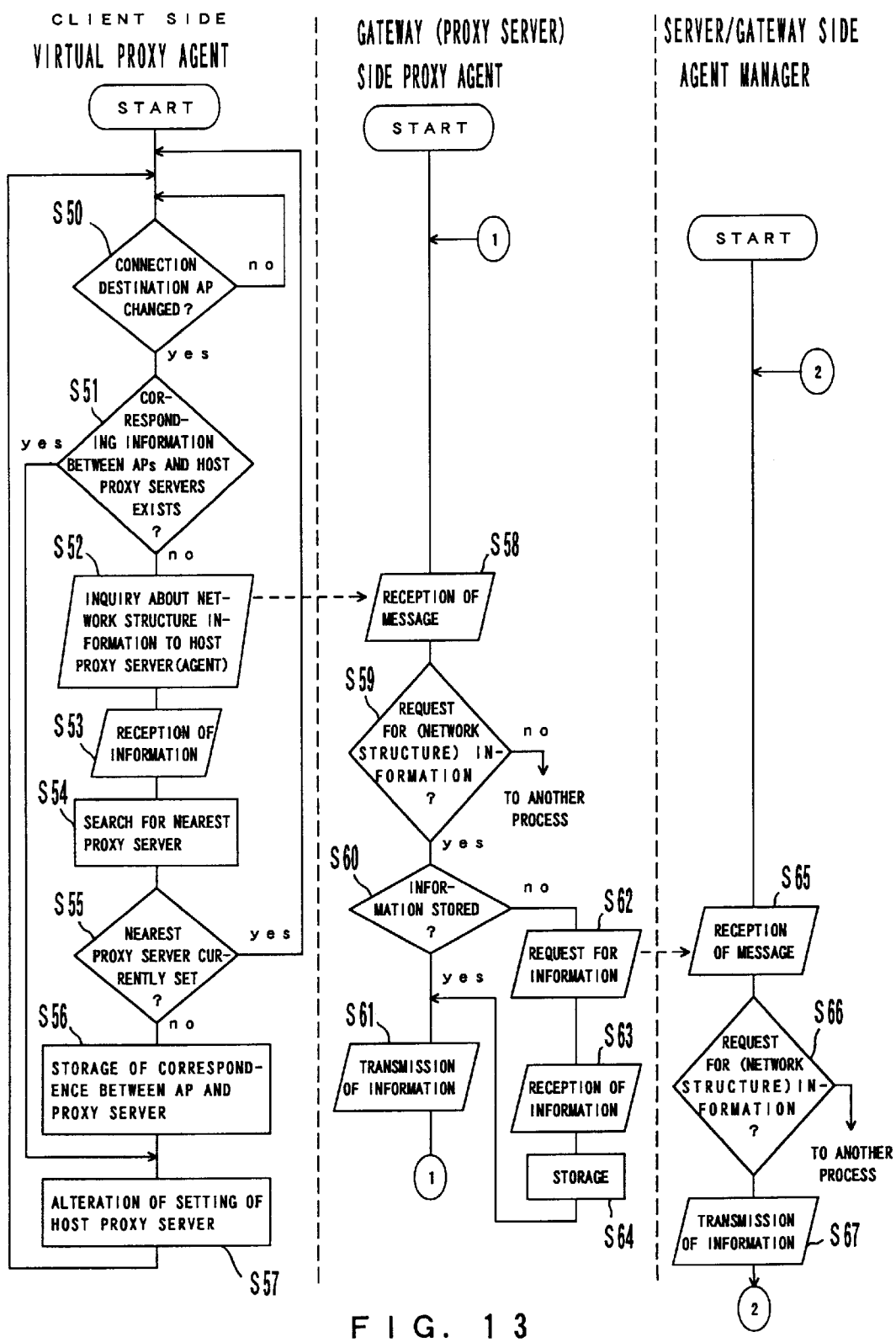
FIG. 13 is a flowchart showing the process of respective portions in the architecture which includes the virtual proxy server depicted in FIG. 12.

FIG. 13 is a flowchart showing the process of respective portions in the architecture which includes the virtual proxy server agent depicted in FIG. 12.

The virtual proxy agent 92 on the side of the client 11 is first monitoring whether or not a connection-destination access point has changed, at step S50. Insofar as the access point does not change, step S50 is iterated. When the change of the access point has been detected at step S50, it is judged at step S51 whether or not the side of the client 11 possesses the mapping information items between access points and host proxy servers (proxy servers which exist at positions nearer to the server 10 or WWW server 20). In a case where the mapping information items are possessed, the processing flow advances to step S57, at which the setting of the host proxy server is altered on the basis of the mapping information items.

In case of the judgement at step S51 that the mapping information items are not possessed, an inquiry about network structure information items is sent to the proxy agent of the host proxy server at step S52. Thereafter, the client side stands by for the reception of the information items at step S53. When the network structure information items have been received, the nearest proxy server is searched for at step S54, and whether or not the proxy server currently set is the nearest proxy server is judged at step S55. In a case where the nearest proxy server is set, the setting of the proxy server need not be altered, and hence, the processing flow returns to step S50.

In case of the judgement at step S55 that the proxy server currently set is not the nearest proxy server, the correspondence between the access point and the proxy server as found at step S54 is stored at step S56, and the setting of the host proxy server is altered to the pertinent proxy server at step S57.

Meanwhile, the proxy agent 94 on the side of the gateway G1 which was the nearest proxy server before the roaming of the client 11 receives a message from the virtual proxy agent 92 on the side of the client 11 at step S58, and it judges at step S59 whether or not the message contains the request for the network structure information.

On condition that the message does not contain the request for the network structure information, a process designated by the message is executed. This process is indicated by "To another process" in FIG. 13. Since, however, the process is not directly relevant to this embodiment, it shall be omitted from description. On condition that the request for the network structure information has been judged at step S59, whether or not the information is possessed in the gateway G1 itself is judged at step S60.

Subject to the judgement that the information is possessed, the possessed information is transmitted to the virtual proxy agent 92 (step S61), and the processing flow returns to step S58, at which the proxy agent 94 stands by for the reception of a message. Subject to the judgement at step S60 that the information is not possessed, a request for the information is sent to the agent manager 90 at step S62. When the information has been received at step S63, the received network structure information is stored at step S64, whereupon the processing flow advances to step S61. At this step S61, the information is transmitted to the virtual proxy agent 92 on the side of the client 11. Then, the processing flow returns to step S58.

In the agent manager 90, when a message has been received from the proxy agent 94 at step S65, whether or not the message contains the request for the network structure information is judged at step S66. In a case where the message does not contain the request for the network structure information, another process complying with the message is executed. Also here, "another process" shall be omitted from description.

Subject to the judgement at step S66 that the message contains the request for the network structure information, the network structure information already possessed or acquired anew is transmitted to the proxy agent 94 at step S67. Thereafter, the processing flow returns to step S65, at which the reception of a message is waited.

According to the present invention, data communications are performed over a computer network in adaptation to the situations of terminals and the computer network, as well as the changes of the situations. It is therefore possible to attain such effects as the exchange of data appropriate for the terminals, the shortening of data communication time periods, and the increased number of users allowable in the computer network as a result of the shorter time periods for data communication.

What is claimed is:

1. A communication system for a computer network having different networks, comprising:

agent means for communicating with one another, thereby to perform communication controls of communication data which are exchanged through the computer network;

gateway means for connecting the different networks, each of said gateway means including agent platform means for accepting and running at least one of said agent means;

terminal means, each including at least one of said agent means, for performing data communication through said computer network; and agent manager means for managing said agent means operating to sense situations of said terminal means and said computer network, as well as changes of said situations and for transmitting said agent means to an appropriate gateway means in accordance with the change of the situation of said computer network; wherein the gateway agents run in the gateway means, and the terminal agents run in the terminal means acquire information on said terminal means and information on a situation of the network, as well as a change of situation, respectively, and the gateway agents and the terminal agents communicate with each other, thereby to cooperate while exchanging the information items respectively acquired.

2. A communication system for a computer network as recited in claim 1, wherein when image data is to be transferred from one of said terminal means to an other terminal means through said computer network, said gateway means transmits only part of the received image data to said other terminal means in a case where said gateway agent runs in said gateway means have acquired the situation that said other terminal means cannot display all of said image data.

3. A communication system for a computer network as recited in claim 1, wherein when image data is to be transferred from one of said terminal means to an other terminals means through said computer network, said gateway means generates image data with pixel data of a received image data thinned out and transmits the generated image data of the thinned-out pixel data to said other terminal means in a case where said gateway agent runs in said gateway means have acquired the situation that said other terminal means cannot display all of said received image data.

4. A communication system for a computer network as recited in claim 1, wherein:
   said terminal means includes virtual proxy agent means having functions similar to those of each of said gateway means for specifying one of said gateway means nearest from an existing position of the terminal means and establishing a communication connection between the nearest gateway means and said terminal means; and
   said virtual proxy agent means automatically switching said nearest gateway means to another of said gateway means nearest to a new existing position of said terminal means so as to establish a new communication connection, in a case where said terminal means has roamed until said nearest gateway means changes to other gateway means.

5. A communication system for a computer network as recited in claim 1, wherein each of said agent means of said terminal means and said gateway means is encapsulated, and such encapsulated agent means communicate with one another, thereby to perform the data communication controls through said computer network.

6. A communication system for a computer network as recited in claim 5, further comprising movement means operating with roaming of said terminal means, for moving said agent means from a first gateway means with which said terminal means was communicating through said computer network before the roaming, to a second gateway means with which said terminal means communicates after said roaming.

7. A communication system for a computer network as recited in claim 5, wherein said terminal means includes agent platform means for running said agent means accepted through said computer network, thereby to perform the data communication control through second gateway means by using said agent means.

8. A communication system for a computer network as recited in claim 5, wherein said gateway means includes agent platform means for running said agent means accepted through said computer network, thereby to perform the data communication control through a second gateway means by using said agent means.

9. A communication system for a computer network as recited in claim 5, wherein said terminal means includes:
   agent reception means for receiving said agent means through said computer network; and
   agent platform means for running the received agent means; wherein
      the communication control is performed using said agent means.

10. A communication system for a computer network as recited in claim 9, wherein said terminal means further includes agent check means for checking whether said agent means received by said agent reception means is proper agent means or improper agent means, for deleting the improper agent means, and for activating and operating the proper agent means by said agent platform means.

11. A communication system for a computer network as recited in claim 5, wherein said gateway means includes:
   agent reception means for receiving said agent means through said computer network; and
   agent platform means for running the received agent means; wherein
      the communication control is performed using said agent means.

12. A communication system for a computer network as recited in claim 11, wherein said gateway means further includes agent check means for checking whether said agent means received by said agent reception means is proper agent means or improper agent means, for deleting the improper agent means, and for activating and operating the proper agent means by said agent platform means.

13. A communication system for a computer network as recited in claim 1, wherein said gateway means adaptively process and convert the communication data passing therethrough, on the basis of information items on the situation of said terminal means and said computer network, as well as changes of said situations.

14. A communication system for a computer network having different networks, comprising:
   gateway means for connecting the different networks;
   terminal means for performing data communication via the computer network; and
   agent manager means for managing said agent means operating to sense situations of said terminal means and said computer network, as well as changes of said situations, and for transmitting said agent means to the appropriate gateway means in accordance with a change of the situations of said computer network;
   wherein said gateway means notifies said terminal means of a situation and a change of the situation of the computer network, and said terminal means notifies said gateway means of information on said terminal means so that communication of the terminal means via the computer network is adapted to the situation and the change of the situation of the computer network.

15. A communication system for a computer network according to claim 14, wherein said terminal means comprises agent means for acquiring the information on said terminal means and notifying said gateway means of the information.

16. A communication system for a computer network according to claim 15, wherein
   said agent means is sent to and installed in said terminal means if necessary.

17. A communication system for a computer network according to claim 14, wherein
   said gateway means comprises agent means for acquiring the situation and the change of the situation of the computer network.

18. A communication system for a computer network according to claim 17, wherein
   said agent means is sent to and installed in said gateway means.

19. A communication system for a computer network according to claim 14, wherein
   when a first terminal means sends graphic data to a second terminal means via the computer network, said gateway means sends only a part of the graphic data to the second terminal means if said gateway means detects that the second terminal means cannot display all of the graphic data.

20. A communication system for a computer network according to claim 14, wherein
   when a first terminal means sends graphic data to a second terminal means via the computer network, said gateway means sends reduced graphic data to the second terminal means if said gateway means detects that the second terminal means cannot display all of the graphic data.

21. A communication system for a computer network according to claim 14, wherein said terminal means is movable and performs communication via said gateway means nearest to a place to which said terminal means is moved.

22. A communication system for a computer network according to claim 14, wherein said gateway means adaptively process and convert communication data passing therethrough, on a basis of the information on the situation and the change of the situation of said terminal means and the computer network.

23. A terminal for performing communication via a computer network comprising different networks connected by gateways, comprising:

interface means for performing communication via the computer network;

agent means for acquiring information on the computer network supplied from the gateways, sending information on the terminal to the gateways, and performing communication adaptively to a situation and a change of the situation of the computer network, and processing a capability of the terminal ;and virtual proxy agent means having a same function as the gateways for determining one of the gateways which is nearest to a place of the terminal and establishing a communication connection between the terminal and the one of the gateways.

24. A terminal according to claim 23, wherein said virtual proxy agent means automatically change a gateway to which the terminal is to be connected to another one of the gateways when a nearest gateway has changed to another one of the gateways because of a movement of the terminal.

25. A gateway for forming a computer network by connecting different networks and enabling communication between terminals connected to the computer network, comprising:

interface means for enabling communication between the terminals via the computer network; and means for acquiring information on the terminals supplied from the terminals, sending to the terminals a situation and a change of the situation of the computer network, and processing and converting data to be sent to the terminals on a basis of the situation and a change of the situation of the computer network, and a processing capability of the terminals.

26. A gateway according to claim 25, wherein when said gateway sends graphic data to the terminals, said gateway sends a part of the graphic data to the terminals if the terminals cannot display all of the graphic data.

27. A gateway according to claim 25, wherein when said gateway sends graphic data to the terminals, said gateway sends reduced graphic data to the terminals if the terminals cannot display all of the graphic data.

28. An agent installed in gateways and terminals composing a computer network, for controlling communication between the terminals, comprising:

acquiring means for acquiring a situation and a change of a situation of the computer network if the agent is installed in the gateways, and acquiring information on a terminal if the agent is installed in the terminals;

sending means for sending information acquired by said acquiring means to another agent; and receiving means for receiving information sent from another agent, wherein the agent adaptively controls communication between the terminals via the computer network according to a situation and a change of the situation of the computer network on the basis of information received by said receiving means and information acquired by said acquiring means; and wherein said agent connects a terminal to the computer network via a gateway which has become nearest to the terminal when a gateway nearest to the terminal has changed according to a movement of the terminal.

* * * * *